United States Patent Office 3,751,421
Patented Aug. 7, 1973

3,751,421
SUBSTITUTED 3,5,6-TRIHALO-2-PYRIDYL
CARBONATES
Richard A. Nyquist, Midland, and Thomas L. Reder, Bay City, Mich., assignors to The Dow Chemical Company, Midland, Mich.
No Drawing. Filed Aug. 2, 1971, Ser. No. 168,434
Int. Cl. C07d 31/34
U.S. Cl. 260—295 R                 5 Claims

ABSTRACT OF THE DISCLOSURE 3,5,6-trihalo-2-pyridyl carbonates corresponding to the formula

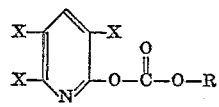

wherein each X is independently chlorine, fluorine or bromine and R represents:
(a) loweralkyl of 1 to 4 carbon atoms, inclusive, excepting the tert-butyl configuration;
(b) halo loweralkyl of 1 to 4 carbon atoms, inclusive;
(c) loweralkenyl of 2 to 4 carbon atoms, inclusive;
(d) loweralkynyl of 3 to 4 carbon atoms, inclusive;
(e) (loweralkoxyloweralkoxy)loweralky wherein the terminal loweralkoxy group contains from 1 to 4 carbon atoms, inclusive, the internal loweralkoxy group contains from 2 to 4 carbon atoms, inclusive, and the loweralkyl group contains from 2 to 4 carbon atoms, inclusive; their preparation and utility as fungicides and herbicides is disclosed.

SUMMARY OF THE INVENTION

The present invention is concerned with 3,5,6-trihalo-2-pyridyl carbonates having the formula

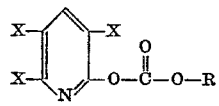

wherein each X is independently chlorine, fluorine, or bromine and R represents:

(a) loweralkyl of 1 to 4 carbon atoms, inclusive, excepting the tert-butyl configuration;
(b) halo loweralkyl of 1 to 4 carbon atoms, inclusive, wherein the number 1 carbon atom can be substituted with not more than one halo atom, the succeeding carbon atoms in the chain can be substituted with from 1 to 2 halo atoms, inclusive, and the terminal carbon atom in the chain can be substituted with from 1 to 3 halo atoms, inclusive;
(c) loweralkenyl of 2 to 4 carbon atoms, inclusive;
(d) loweralkynyl of 3 to 4 carbon atoms, inclusive; or
(e) (loweralkoxyloweralkoxy)loweralkyl wherein the terminal loweralkoxy group contains from 1 to 4 carbon atoms, inclusive, the internal loweralkoxy group contains from 2 to 4 carbon atoms, inclusive, and the loweralkyl group contains from 2 to 4 carbon atoms, inclusive.

The term "loweralkyl" as employed in the present specification and claims designates a straight or branched chain alkyl radical containing from 1 to 4 carbon atoms, inclusive, such as, for example, methyl, ethyl, propyl, isopropyl, cyclopropyl and butyl, excepting the tert-butyl configuration.

The terms "halo" and "halogen" as employed in the present specification and claims designate fluorine, chlorine or bromine.

The term "halo loweralkyl" as employed in the present specification and claims designates a straight or branched chain loweralkyl radical of 1 to 4 carbon atoms, inclusive, wherein the number 1 carbon atom in the chain can be substituted with not more than one halo atom, the succeeding carbon atoms in the chain can be substituted with from 1 to 2 halo atoms, inclusive, and the terminal carbon atom in the chain can be substituted with from 1 to 3 halo atoms, inclusive.

The term "loweralkenyl" as employed in the present specification and claims designates an alkenyl radical containing from 2 to 4 carbon atoms, inclusive, such as, for example, vinyl, propenyl, 2-butenyl and 3-butenyl.

The term "loweralkynyl" as employed in the present specification and claims designates an alkynyl radical containing 3 or 4 carbon atoms, inclusive, such as, for example, 1-propynyl, 2-propynyl, 1-butynyl and 3-butynyl.

The term "(loweralkoxyloweralkoxy)loweralkyl" as employed in the present specification and claims designates a (loweralkoxyloweralkoxy)loweralkyl radical (—Z—O—Z'—O—Z") wherein the terminal loweralkoxy group (O—Z") contains from 1 to 4 carbon atoms, inclusive, the internal loweralkoxy group (O—Z') contains from 2 to 4 carbon atoms, inclusive, and the loweralkyl group (Z) contains from 2 to 4 carbon atoms, inclusive, such as, for example, (2-ethoxybutoxy)ethyl, 2-(2-butoxyethoxy)ethyl and 4-(3-butoxypropoxy)butyl.

The compounds of the present invention are prepared by reacting an appropriate 3,5,6-trihalo-2-pyridinol with an appropriate chloroformate in benzene and pyridine according to the following reaction scheme

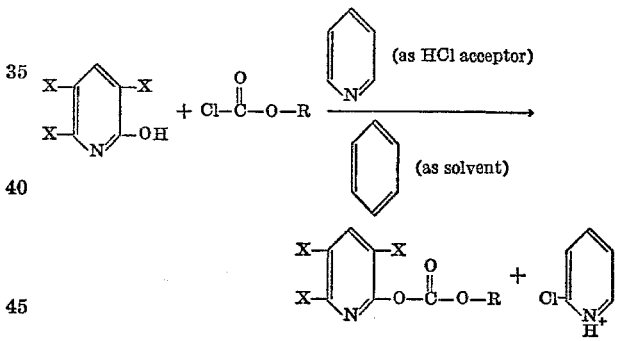

wherein X and R are as defined herein above.

The 3,5,6-trihalo-2-pyridyl carbonates are recovered by well known procedures such as filtration, evaporation and decantation.

DESCRIPTION OF SOME PREFERRED EMBODIMENTS

The following examples illustrate the present invention and the manner by which it can be practiced but, as such, should not be construed as limitations upon the overall scope of the same.

Example 1

Allyl 3,5,6-trichloro-2-pyridyl carbonate

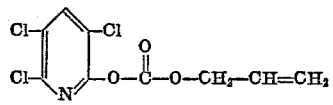

A solution was prepared by dissolving 2.03 grams (g) of 3,5,6-trichloro-2-pyridinol in 600 milliliters (ml.) of benzene; 0.83 g. of pyridine was added thereto. In a dropwise manner 1.25 g. of allyl chloroformate was thereafter added to the solution. The solution turned milky white due to the formation of pyridine hydrochloride. The solution was filtered to remove the pyridine hydrochloride and the filtrate allowed to evaporate to dryness in a hood at room temperature. A low melting point white solid residue of essentially theoretical yield was obtained whose IR spectra showed no evidence for the presence of pyridine, pyridine hydrochloride, benzene, 3,5,6-trichloro-2-pyridinol or allyl chloroformate.

This spectrum clearly confirmed the structure given above.

Example 2

Ethyl 3,5,6-trichloro-2-pyridyl carbonate

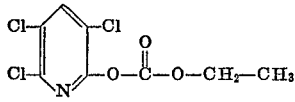

2.38 g. of 3,5,6-trichloro-2-pyridinol was dissolved in approximately 600 ml. of benzene, and 0.96 g. of pyridine was added thereto. 1.35 g. of ethyl chloroformate was added dropwise, causing the solution to turn milky white due to the formation of pyridine hydrochloride. The solvent was allowed to evaporate off after the solution was filtered. The product was decanted from the pyridine hydrochloride solid which remained. IR analysis confirmed the given structure.

Example 3

2,2,3,3-tetrabromopropyl-3,5,6-trichloro-2-pyridyl carbonate

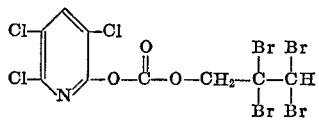

2.46 g. of 3,5,6-trichloro-2-pyridinol was dissolved in about 80 cubic centimeters (cc.) of acetone; about 1 cc. of pyridine was added thereto. A slight excess (5.46 g.) of 2,2,3,3-tetrabromopropyl chloroformate was slowly stirred into the solution; the orange bromine color faded to a light yellow. The solution was set aside to allow the acetone to evaporate. The precipitate which remained was dissolved in benzene, filtered and again set aside to evaporate. An IR analysis of this precipitate confirmed the structure shown above.

Example 4

2-propynyl-3,5,6-trichloro-2-pyridyl carbonate

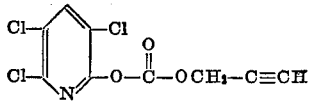

Into about 400 ml. of benzene was added 2.00 g. of 3,5,6-trichloro-2-pyridinol followed by 0.83 g. of pyridine. In a dropwise fashion 1.30 g. of 2-propynyl chloroformate was thereafter added; the drops turned a milky white before being dissipated into the solution. The solution was placed in a large evaporating bowl and allowed to evaporate for about 3 days. A white solid (pyridine hydrochloride) and about 4 cc. of a thick liquid product remained; this liquid was taken off with a syringe, and its IR spectrum confirmed the structure given supra.

Example 5

2-(2-methoxyethoxy)ethyl-3,5,6 - trichloro - 2 - pyridyl carbonate

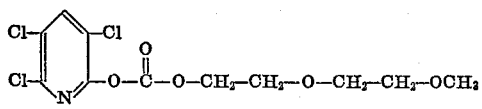

2.05 g. of 3,5,6-trichloro-2-pyridinol was dissolved in approximately 500 ml. of benzene. To this solution was added 0.82 g. of pyridine and thereafter 2.56 g. of 2-(2-methoxyethoxy)ethyl chloroformate. The latter addition turned the solution milky white. After filtration the solution was allowed to evaporate. An IR spectrum of the remaining liquid confirmed the expected structure given above.

The following compounds of the present invention are prepared in accordance with the methods herein set forth (M.W. designates the molecular weight).

Methyl-3,5,6-trichloro-2-pyridyl carbonate, M.W. 256.50,
Butyl-3,5,6-tribromo-2-pyridyl carbonate, M.W. 431.97,
Bromomethyl-3,5,6-trifluoro-2-pyridyl carbonate, M.W. 289.00,
1-fluoro-2-bromo-3,3-dichlorobutyl-3,5,6-trichloro-2-pyridyl carbonate, M.W. 464.39,
4,4,4-trichlorobutyl-3,5,6-trichloro-2-pyridyl carbonate, M.W. 401.94,
Vinyl-3-fluoro-5-chloro-6-bromo-2-pyridyl carbonate, M.W. 296.51,
3-butenyl-3,5-dichloro-6-fluoro-2-pyridyl carbonate, M.W. 280.11,
3-butynyl-3,5,6-trichloro-2-pyridyl carbonate, M.W. 294.55,
4-(4-butoxybutoxy)butyl-3,5,6-trichloro-2-pyridyl carbonate, M.W. 442.83, and
3-(3-propoxypropoxy)propyl-3,5,6-trichloro-2-pyridyl carbonate, M.W. 400.74.

The compounds of the invention are employed as toxicants in herbicides and fungicides. For such uses, the compounds can be employed in an unmodified form or dispersed on a finely divided solid and employed as dusts. Such mixtures can also be dispersed in water with or without the aid of a surface active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing toxicant concentrations usually from about 1 to about 10,000 parts by weight of one or more of the compounds per million parts of such compositions.

In a representative operation, each of the compounds 2-propynyl-3,5,6-trichloro - 2 - pyridyl carbonate, 2,2,3,3-tetrabromopropyl-3,5,6-trichloro - 2 - pyridyl carbonate, ethyl-3,5,6-trichloro - 2 - pyridyl carbonate and 2-(2-methoxyethoxy)ethyl-2-pyridyl carbonate when employed as the sole toxicant in a nutrient agar at a concentration of about 500 parts per million by weight were found to give 100 percent kill and control of the organisms *Trichophyton mentagrophytes* and Trichoderm Sp. Madison p–42.

In additional operations employing the same toxicant concentrations in nutrient agar each of the compounds 2-propynyl-3,5,6-trichloro-2-pyridyl carbonate, 2,2,3,3-tetrabromopropyl-3,5-6-trichloro-2-pyridyl carbonate and 2-(2-methoxyethoxy)ethyl-3,5,6-trichloro - 2 - pyridyl carbonate were found to give 100 percent kill and control of the organisms *Bacillus subtilis, Pullularia pullulans* and *Mycobacterium phlei*.

In another representative operation employing the same concentration of toxicant and nutrient agar the compounds 2,2,3,3-tetrabromopropyl-3,5,6-trichloro - 2 - pyridyl carbonate and 2-(2-methoxyethoxy)ethyl-3,5,6-trichloro - 2 - pyridyl carbonate give 100 percent kill and control of the organisms *Aspergillus terreus* and *Ceratocystis ips;* 2,2,3,3-tetrabromopropyl-3,5,6-trichloro - 2 - pyridyl carbonate at 500 parts per million by weight gives 100 percent kill and control of the organism *Staphylococcus aureus*.

In herbicidal tests, each of the compounds 2-propynyl-3,5,6-trichloro-2-pyridyl carbonate, 2,2,3,3-tetrabromopropyl-3,5,6-trichloro-2-pyridyl carbonate, ethyl-3,5,6-trichloro-2-pyridyl carbonate, allyl-3,5,6 - trichloro-2-pyridyl carbonate and 2-(2-methoxyethoxy)ethyl-3,5,6-trichloro-2-pyridyl carbonate when applied as the sole toxicant in an aqueous dispersion at a dosage rate of 4,000 parts by weight per million parts of the ultimate dispersion were found to give 100 percent kill and control of pigweed; and 2-propynyl-3,5,6-trichloro-2-pyridyl carbonate, 2,2,3,3-tetrabromopropyl - 3,5,6-trichloro-2-pyridyl carbonate and ethyl-3,5,6-trichloro-2-pyridyl carbonate at the same concentration were found to give 100 percent kill and control of wild mustard charlock.

In additional herbicidal tests using a toxicant concentration of 4,000 parts by weight per million by weight each of the compounds 2-propynyl-3,5,6-trichloro-2-pyridyl carbonate, ethyl-3,5,6-trichloro-2-pyridyl carbonate and allyl-3,5,6-trichloro-2-pyridyl carbonate when applied as an aqueous dispersion were found to give 100 percent kill and control of crabgrass.

When applied at a dosage level of from about 500 to about 10,000 parts per million, each of the compounds of the present invention, the utility of which is not specifically recited hereinabove, has the ability to kill, inhibit or otherwise control one or more of the above said or other fungal, bacterial, parasital or weed pests.

PREPARATION OF STARTING MATERIALS

The chloroformates used in the preparation of the compounds of the present invention are prepared by reacting an appropriate alcohol with phosgene at low temperatures according to the following reaction scheme

wherein R is defined as hereinabove. The hydrochloric acid is removed by slowly raising the temperature of the solution after the above reaction is completed and distilling the solution.

Additionally, the halo substituted loweralkyl chloroformates can be prepared by first synthesizing an appropriate unsaturated chloroformate and thereafter reacting this so formed compound with the desired halogen.

The 3,5,6-trihalo-2-pyridinols employed in the preparation of the compounds of the present invention can be produced by the known processes of halogenation and hydrolysis as set forth in Rev. Trav. Chem. at 69, 685 (1950), 74, (1955), and 69, 1281 (1950), and in J. Chem. Soc. 83, 400.

We claim:
1. A compound corresponding to the formula

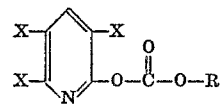

wherein each X is independently chlorine, fluorine or bromine and R represents:

halo loweralkyl of 1 to 4 carbon atoms, inclusive, wherein the number 1 carbon atom can be substituted with not more than one halo atom, the succeeding carbon atoms in the chain can be substituted with from 1 to 2 halo atoms, inclusive, and the terminal carbon atom in the chain can be substituted with from 1 to 3 halo atoms, inclusive;
loweralkenyl of 2 to 4 carbon atoms, inclusive;
loweralkynyl of 3 to 4 carbon atoms, inclusive, or
(loweralkoxyloweralkoxy)loweralkyl wherein the terminal loweralkoxy group contains from 1 to 4 carbon atoms, inclusive, the internal loweralkoxy group contains from 2 to 4 carbon atoms, inclusive, and the loweralkyl group contains from 2 to 4 carbon atoms, inclusive.
2. The compound of claim 1 which is allyl-3,5,6-trichloro-2-pyridyl carbonate.
3. The compound of claim 1 which is 2,2,3,3-tetrabromopropyl-3,5,6-trichloro-2-pyridyl carbonate.
4. The compound of claim 1 which is 2-propynyl-3,5,6-trichloro-2-pyridyl carbonate.
5. The compound of claim 1 which is 2-(2-methoxyethoxy)ethyl-3,5,6-trichloro-2-pyridyl carbonate.

References Cited
UNITED STATES PATENTS
3,234,228   2/1966   Johnston et al. __ 260—294.8 E ALAN L. ROTMAN, Primary Examiner U.S. Cl. X.R.
424—266; 71—94